United States Patent

[11] 3,594,098

| [72] | Inventor | Shrinivas V. Pratinidhi<br>Chatham, Ontario, Canada |
|---|---|---|
| [21] | Appl. No. | 857,849 |
| [22] | Filed | Sept. 15, 1969 |
| [45] | Patented | July 20, 1971 |
| [73] | Assignee | Fram Corporation<br>East Providence, R.I. |
| [32] | Priority | Feb. 28, 1969 |
| [33] | | Great Britain |
| [31] | | 11018/69 |

[54] FAN WITH WEIGHTED FLEXIBLE BLADES
3 Claims, 3 Drawing Figs.

[52] U.S. Cl. ............................................. 416/132,
416/139, 416/144, 416/240
[51] Int. Cl. ................................................. F04d 29/38
[50] Field of Search............................................ 416/51,
131, 132, 144, 139, 240

[56] References Cited
UNITED STATES PATENTS

| 1,537,401 | 5/1925 | Blumschein................... | 416/132 |
| 2,951,542 | 9/1960 | Stulen et al..................... | 416/144 |
| 3,044,557 | 7/1962 | Posh............................... | 416/132 |
| 3,275,082 | 9/1966 | Stark.............................. | 416/132 (X) |
| 3,289,924 | 12/1966 | Weir............................... | 416/240 (X) |
| 3,406,760 | 10/1968 | Weir............................... | 416/240 |

FOREIGN PATENTS

| 236,749 | 7/1911 | Germany........................ | 416/139 |
| 559,674 | 9/1932 | Germany........................ | 416/240 |

Primary Examiner—Everette A. Powell, Jr.
Attorney—W. R. Hulbert

ABSTRACT: An automotive fan having flexible curved blades of resilient material which decamber as rotational speed increases in which an integral portion of each blade, having a mass of the order of 2 percent to 40 percent, preferably 8 percent to 10 percent, of the remainder of the blade, extends continuously along substantially the entire trailing edge of the blade and is folded upon itself at the trailing edge on the upstream side of the blade, thereby rigidifying and weighting the trailing edge to reduce vibration and noise and to assist the decambering of said blade at a predetermined rate.

PATENTED JUL 20 1971

3,594,098

3,594,098

FAN WITH WEIGHTED FLEXIBLE BLADES

This invention relates to fans having flexible blades which decamber as rotational speed increases.

It is a principal object of this invention to provide a flexible bladed fan, particularly for use in an automotive engine, which will reduce fan vibration and noise and which will assist blade deflection at a predetermined rate. In accordance with the invention there is provided in an automotive fan having curved smooth-surfaced resilient blades which decamber as rotational speed increases, the blades each having a leading edge extending in a radial direction and an extended trailing edge generally parallel to said leading edge, continuous structure which is positioned on and continuously connected to each of said blades along substantially the length of the trailing edge which is generally parallel to the leading edge. This structure provides a weight for reducing vibration and noise created by such vibration, and for assisting the decambering of the blades at a controlled rate at increased rotational speed. Preferably the mass of each weight is of the order of 8 percent to 10 percent of the mass of the blade on which it is positioned. In a preferred embodiment the weight-providing structure is formed integrally with the blade by a fold of a small radius at the trailing edge of the blade and is arcuate in cross section, the fold being preferably against the upstream side of the blade.

Other objects, features, and advantages of the present invention will be apparent from the following detailed description of a preferred embodiment thereof, taken together with the accompanying drawings, in which.

Figure 1:
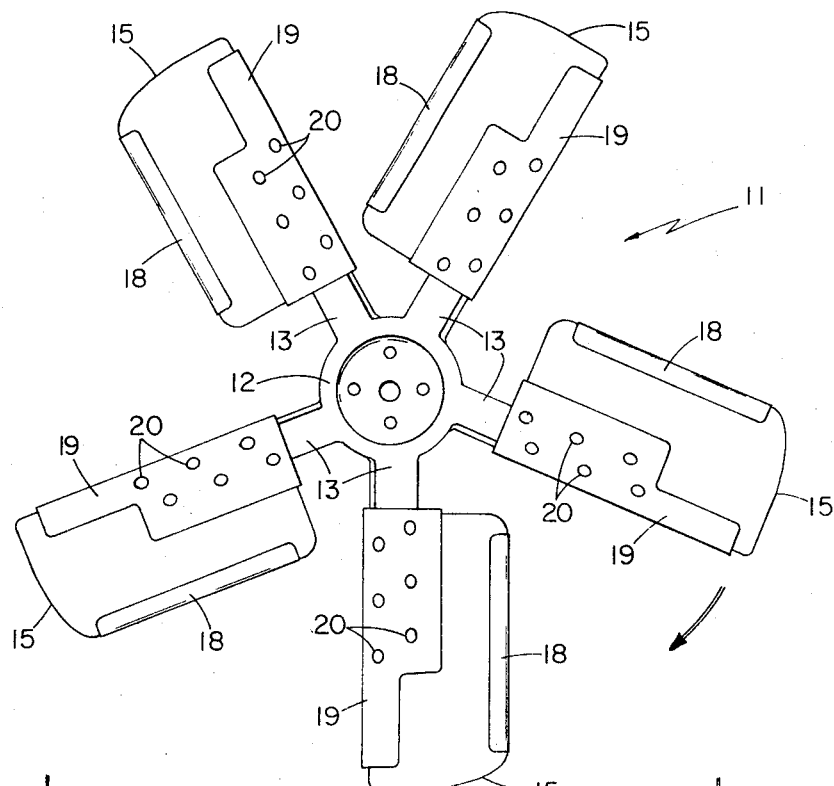
FIG. 1 is a plan view of the upstream side of an engine cooling fan embodying the present invention.
Figure 2:
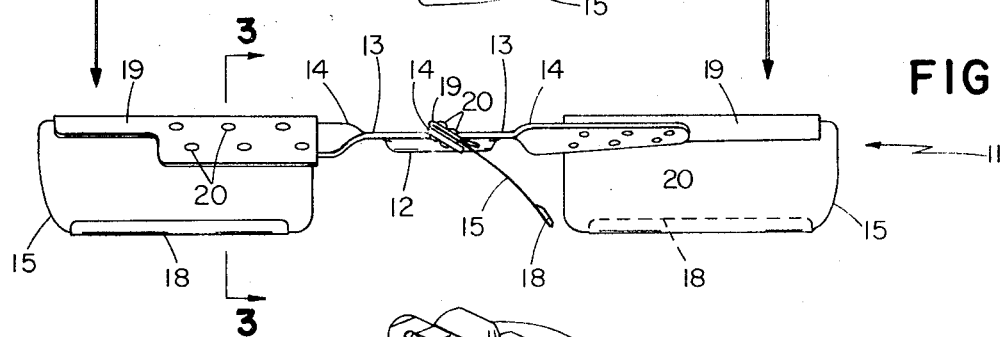
FIG. 2 is a side elevation view of FIG. 1.

Referring in detail to FIGS. 1 and 2 of the drawings, there is shown generally at 11, an engine cooling fan adapted for use on a motor vehicle. The fan has a central planar hub 12, with asymmetrically disposed arms 13 extending therefrom. As best shown in FIG. 2, each arm has a twisted section 14 joining it to the hub so that the plane of each arm is at an angle to the plane of the hub.

A blade 15 of resilient material is secured to the upstream side of each arm 13. Each blade 15, as in FIG. 1, has a straight trailing edge at 18, generally parallel to the leading edge at 19.

Figure 3:
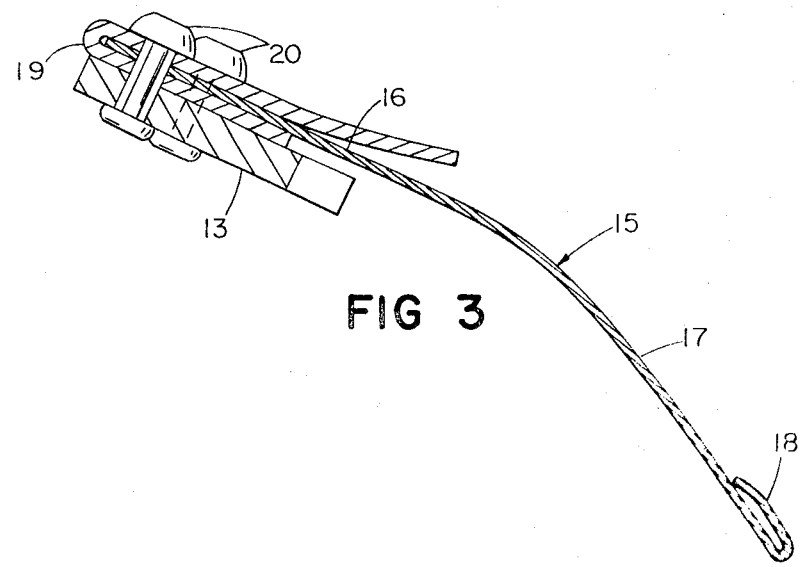
FIG. 3 is an enlarged sectional view of an arm and blade of the fan taken along the line 3-3 of FIG. 2.

As shown in greater detail in FIG. 3, each blade 15 overlies the arm 13 to which it is mounted on the upstream side thereof. The leading portion 16 of the blade is flat and is secured in a reinforcing cap 19. The cap and blade together are fastened by rivets 20 to the arm 13. The trailing portion 17 of blade 15 as shown in the drawings is smooth-surfaced and curved through the plane of arm 13 toward the downstream side the fan, convexly as viewed in FIG. 1. Thus, the trailing edge of each blade is significantly offset from the plane of the central hub 12.

Provided at the trailing edge of each blade 15 is a weight 18. As illustrated, the weight 18 is an integral portion of blade 15 folded upon itself at the trailing edge so as to engage the convex side of the blade. To avoid cracking at the fold and to assist in rigidifying the trailing edge, the bend is made about a small radius rather than sharply back against the blade. The weight extends continuously along substantially the entire length of the blades's trailing edge and has a mass of the order of from 2 percent to 40 percent of the mass of the remainder of the blade, greater weight being employed for a low-speed fan and vice versa. For an automotive fan in which fan speeds approach or exceed 5,000 r.p.m., the weight has a mass of the order of from 8 percent to 10 percent of the mass of the remainder of the blade.

In operation, as the fan rotates clockwise, in the direction indicated by the arrow in FIG. 1, air is moved from upstream to downstream as indicated by the arrows in FIG. 2. As fan speed increases, air pressure and centrifugal forces cause the blades to decamber and the trailing portions of the blades to move toward the plane of the hub 12. The added mass of weight 18 at the trailing edge of each blade assists in decambering of the blade as fan speed increases. Additionally, the provision of a known uniform mass at the trailing edge of each blade results in a more uniform deflection of all the blades and at a predetermined rate. Of particular significance, the added weight and the rigidity of the trailing edge reduce vibration and virtually eliminate certain vibration modes, with a concomitant desirable reduction in fan noise.

Other embodiments of the invention will occur to those skilled in the art from the foregoing nonlimiting description of a preferred embodiment thereof.

What I claim is:

1. In an automotive fan having curved smooth-surfaced resilient blades which decamber as rotational speed increases, said blades each having a leading edge extending in a radial direction and an extended trailing edge generally parallel to said leading edge, that improvement in which continuous structure is positioned on and continuously connected to each of said blades along substantially the length of said trailing edge which is generally parallel to said leading edge, which structure provides a weight for reducing vibration and noise created by such vibration, and for assisting the decambering of said blades at a controlled rate at increased rotational speed.

2. The fan as claimed in claim 1 in which the mass of each said weight is of the order of 8 percent to 10 percent of the mass of the blade on which it is positioned.

3. The fan as claimed in claim 1 wherein each weight-providing structure is formed integrally with the blade by a fold of a small radius at the trailing edge of the blade and is arcuate in cross section.